(12) United States Patent
Delay et al.

(10) Patent No.: US 12,077,038 B2
(45) Date of Patent: Sep. 3, 2024

(54) VEHICLE DOOR ASSEMBLY

(71) Applicant: NISSAN NORTH AMERICA, INC., Franklin, TN (US)

(72) Inventors: Craig Delay, Commerce, MI (US); James Iwanski, Oxford, MI (US); Mitsuyasu Hikosaka, Novi, MI (US); David Lipka, Farmington, MI (US)

(73) Assignee: Nissan North America, Inc., Franklin, TN (US)

( * ) Notice: Subject to any disclaimer, the term of this patent is extended or adjusted under 35 U.S.C. 154(b) by 336 days.

(21) Appl. No.: 17/555,355

(22) Filed: Dec. 17, 2021

(65) Prior Publication Data
US 2023/0191884 A1      Jun. 22, 2023

(51) Int. Cl.
*B60J 5/12* (2006.01)
*B60J 1/18* (2006.01)
(Continued)

(52) U.S. Cl.
CPC ............... *B60J 5/12* (2013.01); *B60J 1/1846* (2013.01); *E05D 15/583* (2013.01); *E05F 15/611* (2015.01); *E05F 15/686* (2015.01); *E05F 15/695* (2015.01); *E05D 2015/586* (2013.01); *E05Y 2201/434* (2013.01);
(Continued)

(58) Field of Classification Search
CPC .... B60J 5/06; B60J 5/12; B60J 1/1846; E05Y 2900/532; E05Y 2900/546; E05Y 2201/434; E05Y 2201/64; E05Y 2201/654; E05Y 2201/684; E05Y 2400/40; E05F 15/665; E05F 15/67; E05F 15/611; E05F 15/686; E05D 15/58–583; E05D 2015/586
See application file for complete search history.

(56) References Cited

U.S. PATENT DOCUMENTS 2,651,541 A * 9/1953 Surles .................. B60J 5/06
296/117
2,819,114 A * 1/1958 Lake ..................... B60J 5/06
49/41
(Continued)

FOREIGN PATENT DOCUMENTS

CN         1590196 A      3/2005
KR      10-0512188 B1     9/2005
(Continued)

*Primary Examiner* — Gregory A Blankenship
(74) *Attorney, Agent, or Firm* — Global IP Counselors, LLP (57) ABSTRACT

A vehicle door assembly includes a vehicle body structure, a first door, a second door and a support assembly. The vehicle body structure has a wall portion that defines a door opening. The support assembly is fixed to the wall portion proximate the door opening and has at least one pair of tracks with door support devices and a motorized door mechanism. The door support devices independently support the first door and the second door for movement along the at least one pair of tracks and the motorized door mechanism is configured to raise and lower the door support devices along with the first door and the second door from respective closed orientations covering corresponding sections of the door opening and open orientations exposing the corresponding sections of the door opening.

19 Claims, 8 Drawing Sheets

(51) Int. Cl.
   *E05D 15/58* (2006.01)
   *E05F 15/611* (2015.01)
   *E05F 15/686* (2015.01)
   *E05F 15/695* (2015.01)

(52) U.S. Cl.
   CPC ..... *E05Y 2201/64* (2013.01); *E05Y 2201/654* (2013.01); *E05Y 2201/684* (2013.01); *E05Y 2400/40* (2013.01); *E05Y 2900/546* (2013.01)

(56) References Cited

U.S. PATENT DOCUMENTS

| | | | |
|---|---|---|---|
| 4,620,743 A | 11/1986 | Eke | |
| 4,801,172 A * | 1/1989 | Townsend | B60J 5/06 70/DIG. 64 |
| 4,940,282 A * | 7/1990 | Townsend | B60J 5/06 296/187.03 |
| 5,921,611 A | 7/1999 | Townsend | |
| 5,979,932 A * | 11/1999 | Jourdaine | B32B 17/10036 280/730.2 |
| 6,234,563 B1 | 5/2001 | Bascou | |
| 6,257,651 B1 * | 7/2001 | Morbach | B60J 5/14 296/147 |
| 6,386,613 B1 | 5/2002 | Vader | |
| 6,485,094 B2 * | 11/2002 | Corder | B60J 5/0479 296/147 |
| 6,494,519 B2 * | 12/2002 | Sturgin | B60J 5/14 296/50 |
| 6,497,448 B1 * | 12/2002 | Curtis | B60J 5/12 296/108 |
| 6,505,882 B1 * | 1/2003 | Morbach | B60J 5/12 296/146.13 |
| 6,874,838 B2 * | 4/2005 | De Gaillard | B62D 33/03 296/76 |
| 7,032,962 B2 * | 4/2006 | Engelgau | B60J 7/043 296/222 |
| 7,188,863 B2 | 3/2007 | Tiesler et al. | |
| 7,334,833 B2 * | 2/2008 | Koelbl | B60J 5/101 296/146.8 |
| 7,631,921 B2 * | 12/2009 | Lewis | B60J 5/101 296/51 |
| 7,828,366 B2 | 11/2010 | Andre et al. | |
| 8,020,912 B2 | 9/2011 | Lounds | |
| 8,132,846 B2 * | 3/2012 | Kitayama | B60J 1/1884 296/216.02 |
| 8,376,449 B2 | 2/2013 | Kitayama et al. | |
| 10,358,854 B1 * | 7/2019 | Guygaew | E05D 15/22 |
| 11,639,201 B2 * | 5/2023 | Selle | B62D 33/03 296/51 |
| 11,958,344 B2 * | 4/2024 | Morrow, Jr. | B60J 5/103 |
| 2018/0099550 A1 * | 4/2018 | Babbage | B60J 1/2088 |
| 2020/0399895 A1 * | 12/2020 | Hall | E04B 2/827 |
| 2021/0381297 A1 * | 12/2021 | Yang | E05F 15/646 |
| 2022/0048581 A1 * | 2/2022 | Ma | B60J 5/12 |
| 2022/0307260 A1 * | 9/2022 | Jensens | E04B 2/828 |
| 2023/0008084 A1 * | 1/2023 | Brown | E05D 15/101 |
| 2023/0191884 A1 * | 6/2023 | Delay | B60J 1/1846 296/146.2 |
| 2023/0243202 A1 * | 8/2023 | Kovie | B60J 5/106 49/334 |
| 2023/0340805 A1 * | 10/2023 | Choi | B60J 5/06 |

FOREIGN PATENT DOCUMENTS

| | | |
|---|---|---|
| KR | 10-1068172 B1 | 9/2011 |
| WO | 2005/080108 A1 | 9/2005 |
| WO | 2015/097321 A1 | 7/2015 |

\* cited by examiner

VEHICLE DOOR ASSEMBLY

BACKGROUND

Technical Field

The present disclosure generally relates to a vehicle door assembly. More specifically, the present disclosure relates to a vehicle door assembly that includes at least a first door and a second door that are movable between respective closed orientations and open orientations with the first door being located above the second door in both the closed orientation and the open orientation.

Background Information

Many vehicles with rear door openings typically include a single door that pivots about hinges between an open orientation and a closed orientation. Other vehicles with rear door openings often include dual doors that pivot about vertically oriented hinges such that the doors swing about vertical axis from respective open orientations to closed orientations.

SUMMARY

One object of the present disclosure is to provide a rear door opening of a vehicle with a plurality of doors that move between respective open and closed orientations in the absence of conventional hinges.

Another object of the present disclosure is to provide a rear door opening of a vehicle with a pair of doors that not directly connected to one another such that the doors can be independently moved in vertical directions (up and down) between open and closed orientations.

In view of the state of the known technology, one aspect of the present disclosure is to provide a vehicle door assembly with a vehicle body structure, a first door, a second door and a support assembly. The vehicle body structure has a wall portion that defines a door opening. The support assembly is fixed to the wall portion proximate the door opening and has at least one pair of tracks with door support devices and a motorized door mechanism. The door support devices independently support the first door and the second door for movement along the at least one pair of tracks. The motorized door mechanism is configured to raise and lower the door support devices along with the first door and the second door from respective closed orientations covering corresponding sections of the door opening and open orientations exposing the corresponding sections of the door opening.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
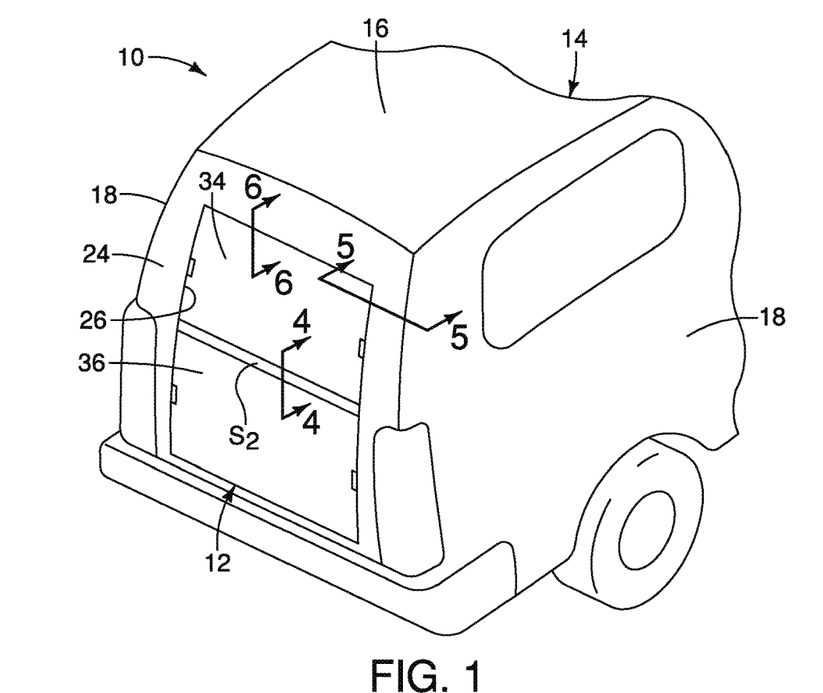
FIG. 1 is a schematic rear view of a vehicle that has a rear door opening with a door assembly that includes a first door and a second door shown in respective closed orientations with both being vertically oriented in accordance with a first embodiment.
Figure 2:
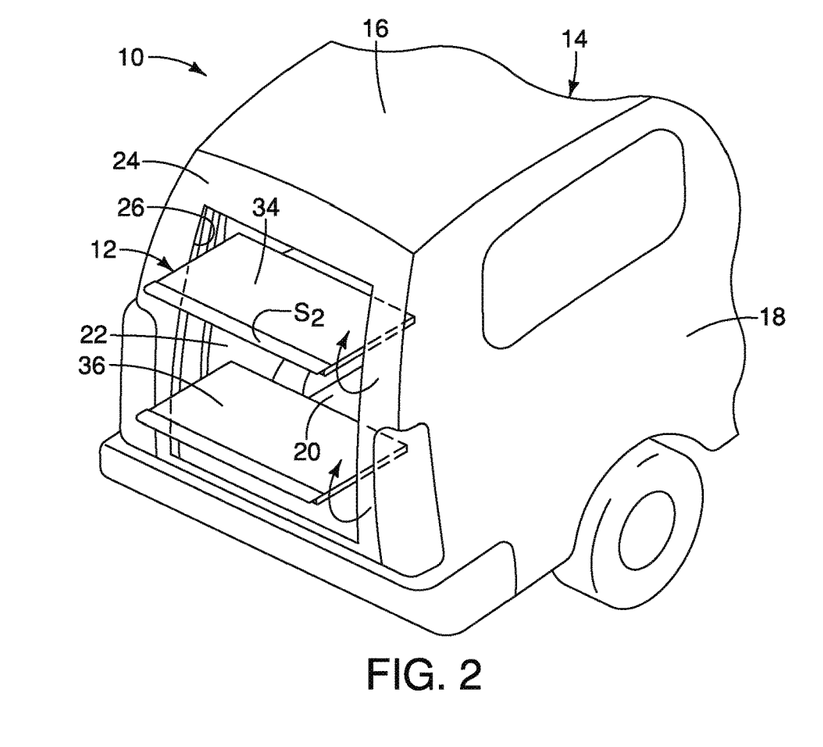
FIG. 2 is another schematic rear view of the vehicle showing the first door and the second door partially open in respective transitional (horizontal) orientations in accordance with the first embodiment.
Figure 3:
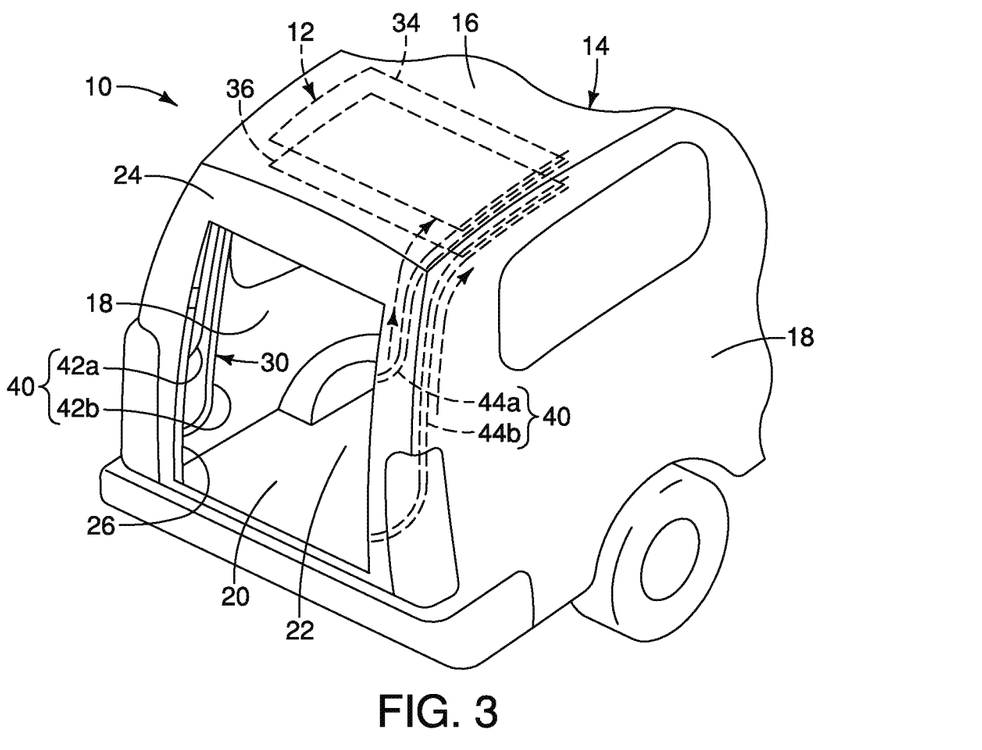
FIG. 3 is still another schematic rear view of the vehicle showing the first door and the second door in respective open orientations stowed horizontally within the vehicle in accordance with the first embodiment.

Referring initially to FIGS. 1-3, a vehicle 10 having a vehicle door assembly 12 is illustrated in accordance with a first embodiment.

The vehicle 10 has a vehicle body structure 14 that includes at least a roof structure 16, side structures 18, floor structures 20 defining a cargo/passenger compartment 22 and a rear wall portion 24 that defines a door opening 26 that provides access to the cargo/passenger compartment 22. The vehicle body structure 14 further includes a door support assembly 30 referred to hereinafter as the support assembly 30.

The vehicle body structure 14 also includes various additional conventional structures, components and elements that are well known in the art. Since these structures, components and elements are well known in the art, further description is omitted for the sake of brevity.

In the first embodiment, the vehicle door assembly 12 includes a first door 34 and a second door 36. The first door 34 and the second door 36 are not directly connected to one another. As described in greater detail below, the first door 34 and the second door 36 are movable between respective closed orientations covering corresponding sections of the door opening 26 and open orientations exposing the corresponding sections of the door opening 26. More specifically, in their respective closed orientations, the first door 34 covers an upper section of the door opening 26 and the second door 36 covers a lower section of the door opening 26. In the open orientation, the first door 34 is separated from and has a non-contacting relationship with the second door 36.

Figure 5:
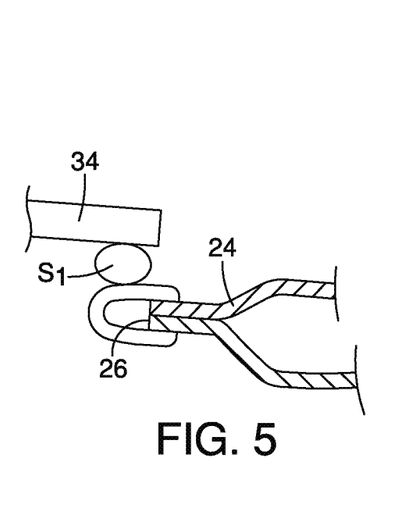
FIG. 5 is a cross-sectional view of the first door and a rear wall portion of the vehicle that defines the door opening, with the first door in its closed orientation taken along the line 5-5 in FIG. 1 showing a seal that extends around the door opening in accordance with the first embodiment.
Figure 6:
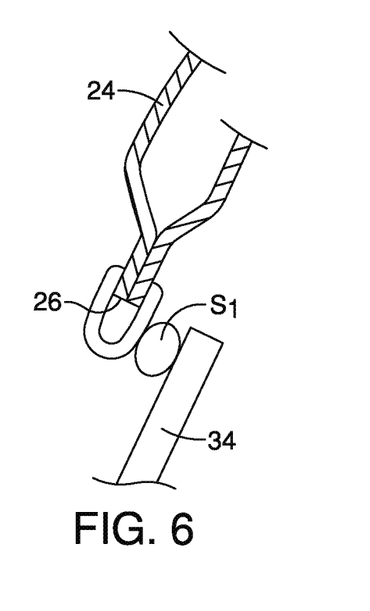
FIG. 6 is a cross-sectional view of the first door and the rear wall portion with the first door in its closed orientation taken along the line 6-6 in FIG. 1 showing the seal that extends around the door opening in accordance with the first embodiment.

The rear wall portion 24 includes a first seal $S_1$ that is installed along an interior surface of the rear wall portion 24 adjacent to the door opening 26. More specifically, the first seal $S_1$ surrounds the door opening 26 such that with the first door 34 and the second door 36 in their respective closed positions, the first and second doors 34 and 36 contact corresponding portions of the seal $S_1$ creating a water seal between the first and second doors 34 and 36 and the rear wall portion 24. The cross-sectional views in FIGS. 5 and 6 show contact between the seal $S_1$ and the first door 34. Similar contact is established between the second door 36 and the seal $S_1$. The seal $S_1$ extends completely around the door opening 26 extending along top, bottom and lateral sides of the door opening 26.

Figure 4:
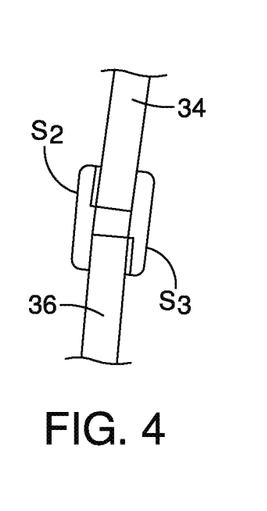
FIG. 4 is a cross-sectional view of the first and second doors in their respective closed orientations taken along the line 4-4 in FIG. 1 showing seals therebetween in accordance with the first embodiment.

As shown in FIG. 4, the bottom outer portion of the first door 34 includes a second seal $S_2$ that contacts an upper outer portion of the second door 36 with the first and second doors 34 and 36 in their respective closed orientations shown in FIG. 1. As is also shown in FIG. 4, the upper inner portion of the second door 36 includes a third seal $S_3$ fixed thereto that contacts a lower inner portion of the first door 34 with the first and second doors 34 and 36 in their respective closed orientations shown in FIG. 1.

In the first embodiment, the first door 34 is made entirely of a transparent material, such as, for example, a laminated automotive glass. The second door 36 is made of a non-transparent material, such as a metallic material, but can alternatively also be made of a transparent material, such as a laminated automotive glass. A further description of specific features of the first door 34 and the second door 36 is provided herein below after a description of the support assembly 30.

The support assembly 30 includes a track assembly 40 that has first track sets 42a and 42b and second track sets 44a and 44b. The first track sets 42a and 42b and second track sets 44a and 44b are fixed to interior surfaces of the rear wall portion 24 adjacent to respective opposite lateral sides of the door opening 26, as shown in FIG. 3. More specifically, the first track sets 42a and 42b are attached to the rear wall portion 24 along a driver's side of the door opening 26 and the second track sets 44a and 44b are attached to the rear wall portion 24 along a passenger's side of the door opening 26.

Figure 7:
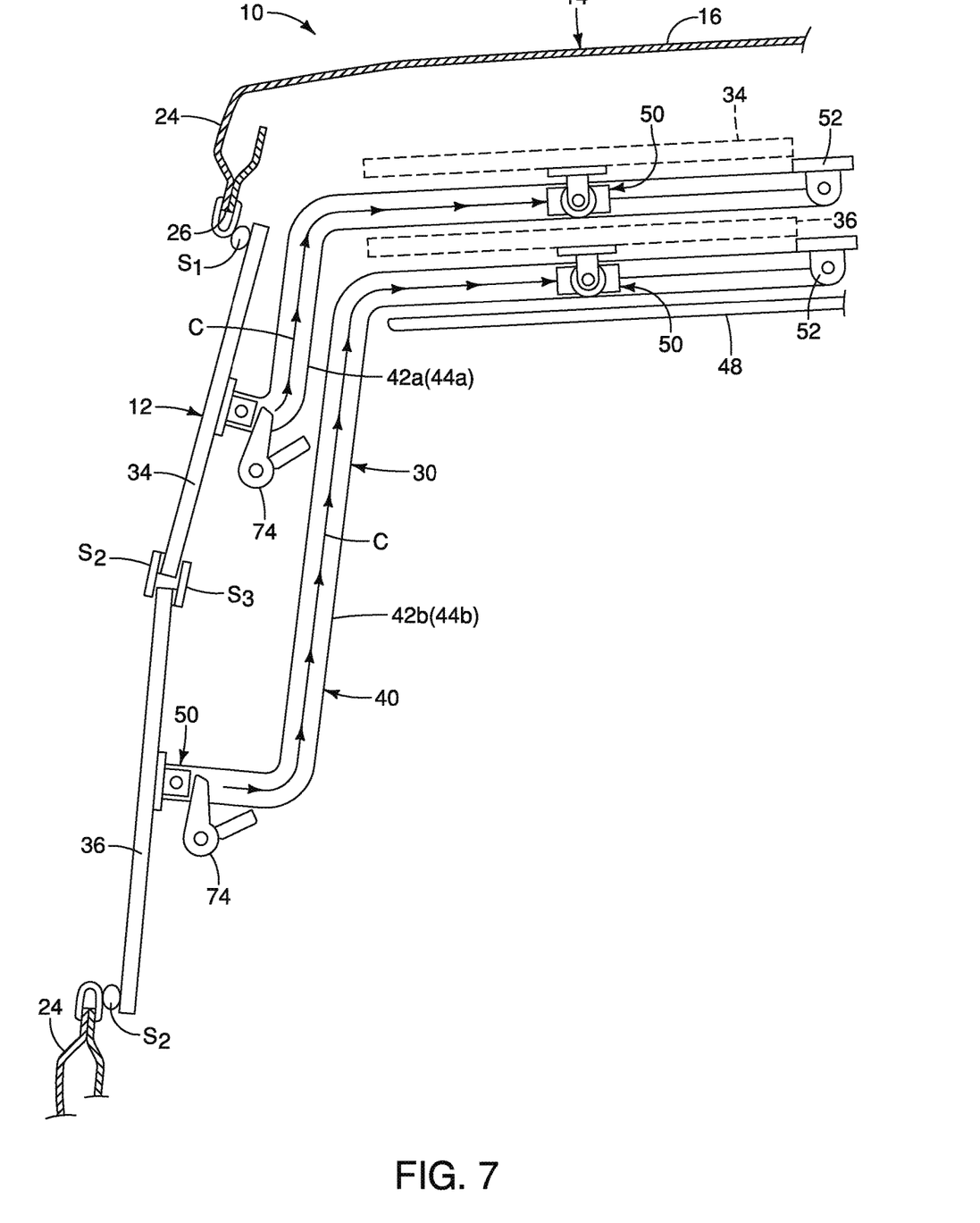
FIG. 7 is a schematic cross-sectional view of a rear portion of the vehicle showing the first door and the second door in solid lines in their respective closed orientations and in their respective open (stowed) orientations in phantom lines along with a track that the first door is guided along during movement and another track that the second door is guided along during movement in accordance with the first embodiment.
Figure 8:
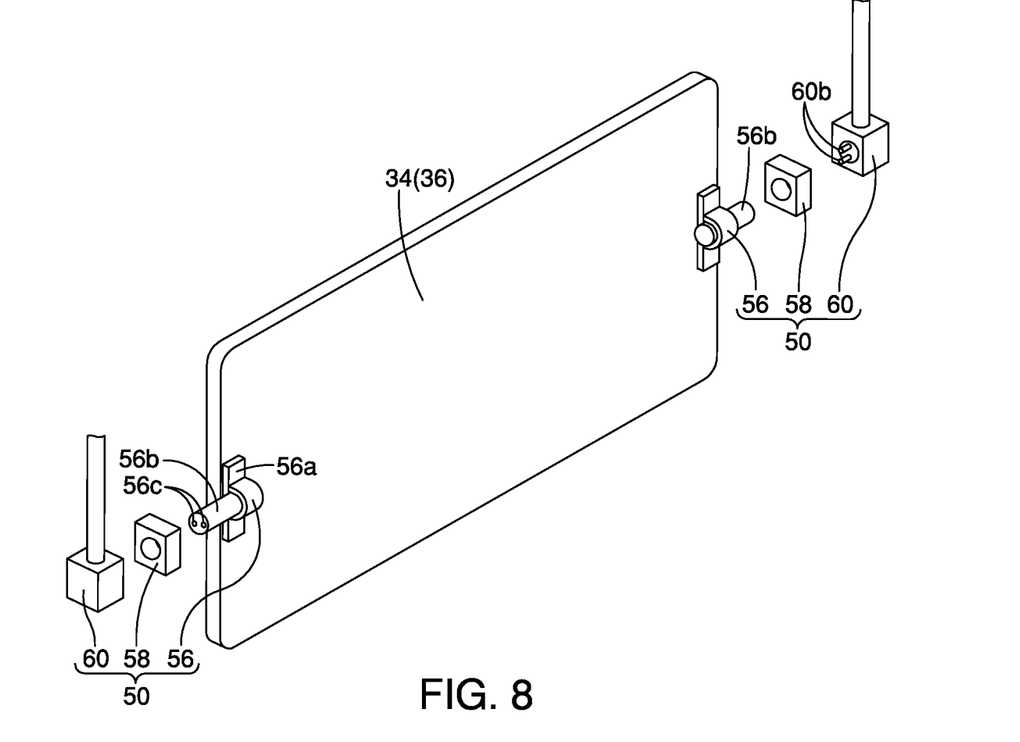
FIG. 8 is a perspective view of one of the doors removed from the vehicle showing door support devices attached to opposite sides thereof in accordance with the first embodiment.
Figure 9:
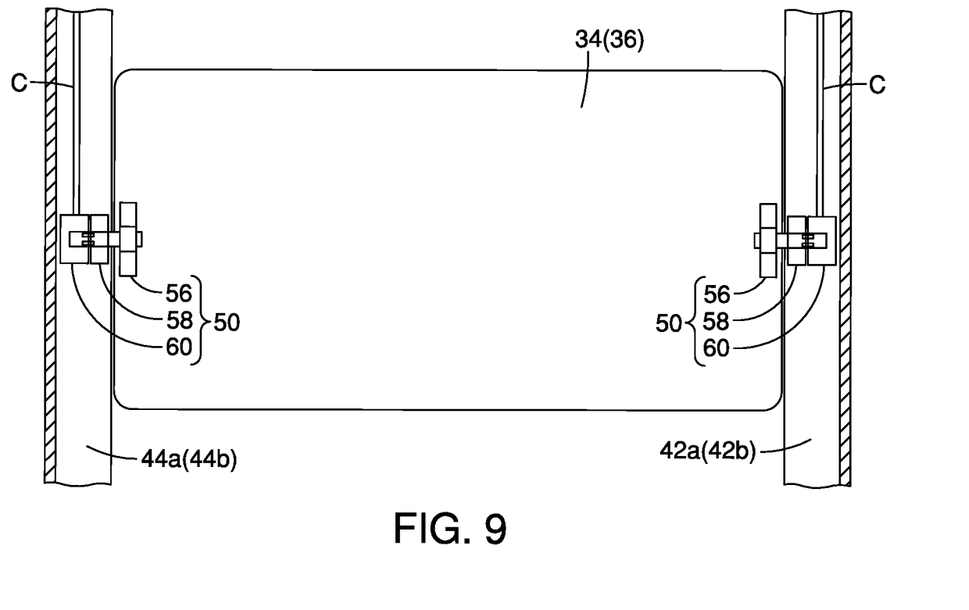
FIG. 9 is a front interior view of one of the doors showing door support devices installed within tracks at opposite sides thereof in accordance with the first embodiment.

The first track sets 42a and 42b and second track sets 44a and 44b are identical to one another except that they are symmetrical mirror images of one another (left-hand side 42a and 42b and right-hand side 44a and 44b). The first and second track sets 42a, 42b, 44a and 44b are also referred to herein as a first pair of tracks 42a and 44a and a second pair of tracks 42b and 44b. Specifically, the first pair of tracks 42a and 44a are dimensioned and positioned to support and direct movement of the first door 34 between the closed orientation (FIG. 1), a transitional orientation (FIG. 2) and an open orientation or stowed orientation (FIG. 3), and the second pair of tracks 42b and 44b are dimensioned and positioned to support and direct movement of the second door 36 between the closed orientation (FIG. 1), a transitional orientation (FIG. 2) and an open orientation or stowed orientation (FIG. 3). As shown in FIG. 7, in their respective stowed orientations (FIG. 3), the first door 34 and the second door 36 are stowed between the roof structure 16 and a headliner 48. The headliner 48 is installed to the side structures 18 and the roof structure 16 in a conventional manner with a gap defined between the roof structure 16 and the headliner 48 at a location adjacent to the rear wall portion 24, as shown in FIG. 7. Since headliners, such as the headliner 48, are conventional vehicle components, further description of the headliner 48 is omitted for the sake of brevity.

The support assembly 30 further includes a plurality of door support devices 50 and a motorized door mechanism 52. There are two door support devices 50 on each door. Specifically, the first door 34 has one door support device 50 on the driver's side and another door support device 50 on the passenger's side. Similarly, the second door 36 has one door support device 50 on the driver's side and another door support device 50 on the passenger's side. In the first embodiment since the first door 34 is made of a transparent material, the door support devices 50 if the first door 34 are directly attached to the transparent material either by mechanical fasteners (not shown) or by an adhesive material with appropriate strength and adhesion properties.

Figure 10:
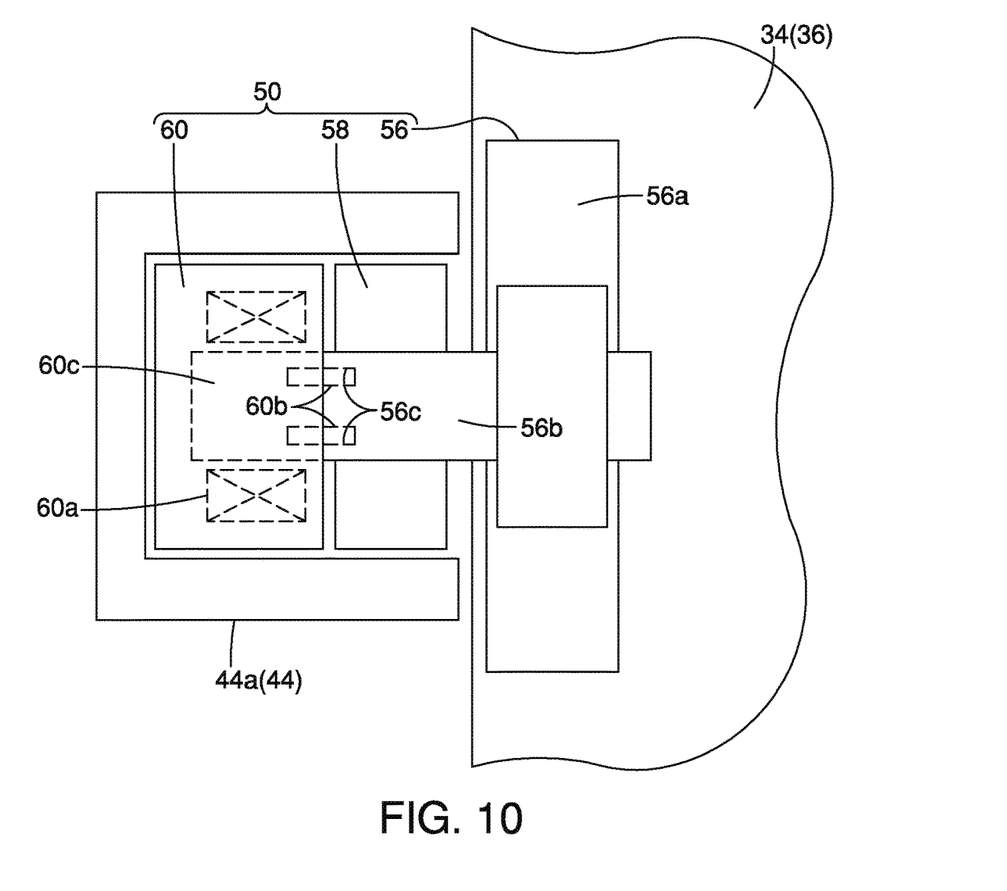
FIG. 10 is a front schematic view of one of the door support devices showing a first part that includes a base portion attached to one side of one of the doors and a shaft portion that extends into a second part of the door support device, the second part being made of a low friction material, the second part being attached to a third part that includes a motor that connects to the shaft portion of the first part and is operated to change the angular orientation of the one of the doors in accordance with the first embodiment.

Each of the door support devices 50 includes a first part 56, a second part 58 and a third part 60. The first part 56 of each of the door support devices 50 defines a base portion 56a that attaches to a corresponding outboard side of one of the first door 34 or the second door 36 and a shaft portion 56b that extends in an outboard direction from the base portion 56a, The shaft portion 56b serves as a pivot shaft for the corresponding one of the first door 34 and the second door 36. An outboard end of the shaft portion 56b includes a pair of motor engaging portions or openings 56c.

The second part 58 of the door support device 50 is a slide or runner that is made of a friction free material, such as, for example, polytetrafluoroethylene (PTFE). The second part 58 is disposed within a corresponding one of the tracks of the track assembly 40 such that the second part 58 is retained within the track but can freely move along the track during movement of the corresponding one of the doors 34 and 36. The second part 58 has a central opening that receives the shaft portion 56b of the first part of the door support device 50. Thus, the second part 58 can freely slide (sliding movement) along and within any one of the tracks of the track assembly 40. Further, while the shaft portion 56b and the corresponding one of the doors 34 and 36 ca freely pivot relative to the second part 58, the second part 58 being confined within the track cannot rotate per se, but can undergo some pivoting movement when moving along any of the curved portions of the corresponding track of the track assembly 40.

The third part 60 of the door support device 50 is basically a motor 60a fixed to the second part 58 for movement therewith. The motor 60a of the third part 60 has two pins 60b that extend from a shaft 60c of the motor 60a that fit into the openings 56c such that when the motor 60a is operated, the shaft 60c can pivot or rotate causing corresponding pivoting or rotating movement of the shaft portion 56b which in turn causes pivoting or rotation of the corresponding one of the doors 34 and 36. The motors 60a are also referred to as orientation changing mechanisms in that the are used to control the vertical and horizontal repositioning of the first door 34 and the second door 36, as described in greater detail below.

The third part 60 is further fixed to a corresponding cable C that extends along the full length of the corresponding one of the tracks 42a, 42b, 44a and 44b to a corresponding one of the motorized door mechanisms 52. One of a plurality of the motorized mechanisms 52, is installed to the roof structure 16 of the vehicle 10 at respective upper forward ends of each of the tracks 42a, 42b, 44a and 44b, Wiring (not shown) is disposed within the cable C that is attached to a corresponding one of the motors 60a of the door support devices 50. Alternatively, the cable C can be a chain.

Figure 11:
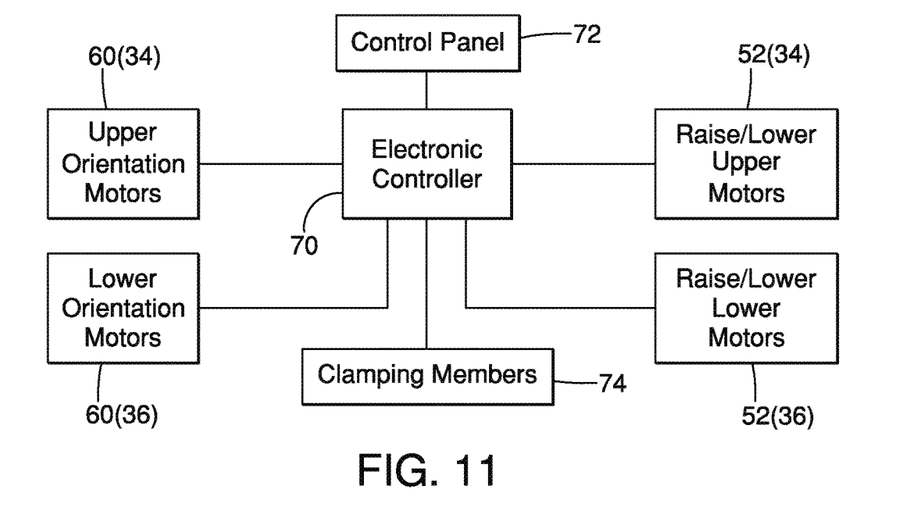
FIG. 11 is a block diagram showing various control elements of the door assembly including an electronic controller, angular orientation motors, raising and lowering motors, a control panel and clamping members in accordance with the first embodiment.

As shown in FIG. 11, the door assembly 12 further includes an electronic controller 70 installed within the vehicle body structure 12. The electronic controller 70 is electronically connected to a control panel 72 located on the instrument panel (not shown) of the vehicle 10. The electronic controller 70 is further connected to the motors of the motorized door mechanisms 52 connected to the door support devices 50 of the first door 34 via corresponding cables C. The motors of the motorized door mechanisms 52 of the first door 34 are referred to in the flow chart in FIG. 11 as the upper motors 52 and are operated by the electronic controller 70 for raising and lowering the first door 34.

The electronic controller 70 is further connected to the motors of the motorized door mechanisms 52 connected to the door support devices 50 of the second door 36 via corresponding cables C. The motors of the motorized door mechanisms 52 of the second door 36 are referred to in the flow chart in FIG. 11 as the lower motors 52 and are operated by the electronic controller 70 for raising and lowering the second door 36.

Similarly, the electronic controller 70 is connected to the third parts 60 of the door support devices 50 attached to the first door 34. The motors 60a of the third part of the door support devices 50 attached to the first door 34 are operated by the electronic controller 70 to pivot the first door 34 between a vertical orientation corresponding to the first door 34 being in the closed orientation (FIG. 1) and a horizontal orientation corresponding to the first door 34 being in either one of the transitional orientation shown in FIG. 2 and the stowed orientation shown in FIG. 3.

As well, the electronic controller 70 is connected to the third parts 60 of the door support devices 50 attached to the second door 36. The motors 60a of the third pail of the door support devices 50 attached to the second door 36 are operated by the electronic controller 70 to pivot the second door 36 between a vertical orientation corresponding to the second door 36 being in the closed orientation (FIG. 1) and a horizontal orientation corresponding to the second door 36 being in either one of the transitional orientation shown in FIG. 2 or the stowed orientation shown in FIG. 3.

Figure 12:
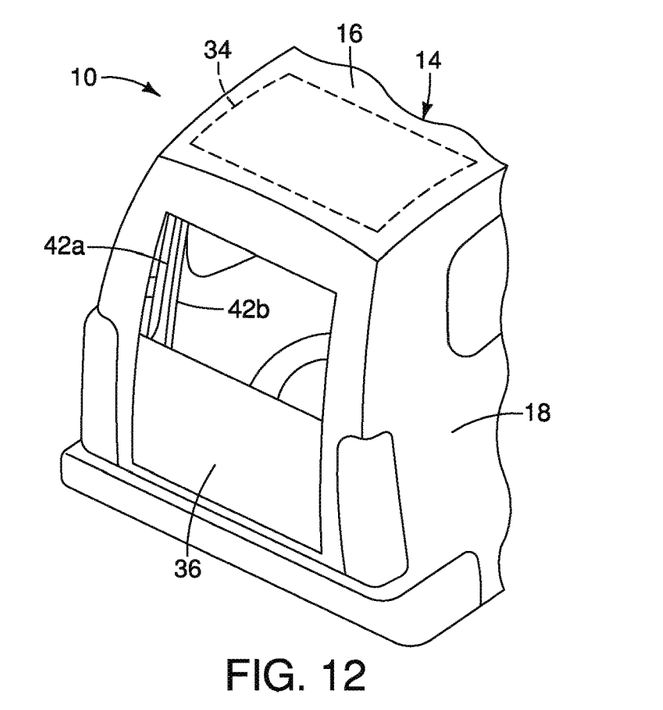
FIG. 12 is a rear schematic perspective view of the vehicle showing the first door in its open or stowed orientation and the second door in its closed orientation in accordance with the first embodiment.
Figure 13:
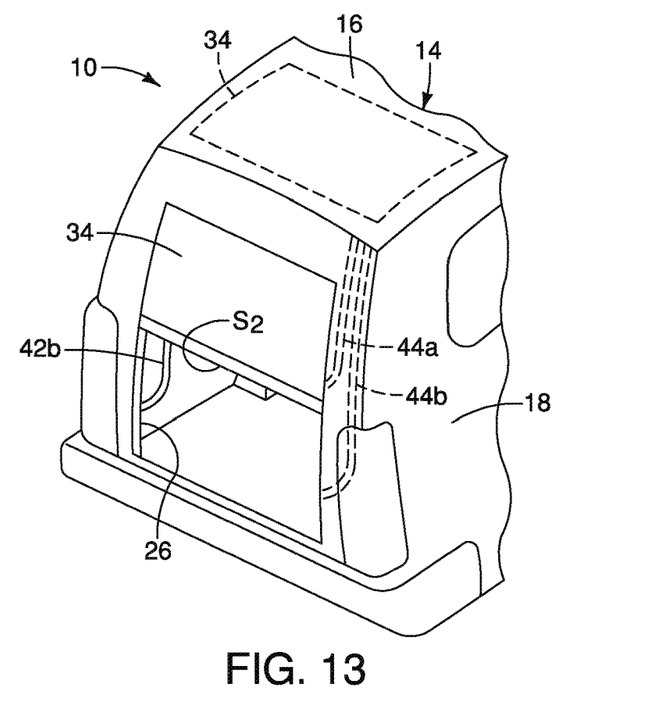
FIG. 13 is another rear schematic perspective view of the vehicle showing the second door in its open or stowed orientation and the first door in its closed orientation in accordance with the first embodiment.

The electronic controller 70 receives operating instructions from the control panel 72. A vehicle operator or passenger presses a button (not shown) or dial (not shown) of the control panel 72 instructing the electronic controller 70 to move the first and second doors 34 and 36 to and from each of the closed orientation shown in FIG. 1, the transitional orientation shown in FIG. 2 and the open orientation or stowed orientation shown in FIG. 3. The control panel 72 can additionally be operated or set to instruct the electronic controller 70 to move only the first door 34 to the stowed orientation leaving the second door 36 in the closed orientation, as shown in FIG. 12. Still further, the control panel 72 can additionally be operated or set to instruct the electronic controller 70 to move only the second door 36 to the stowed orientation leaving the first door 34 in the closed orientation, as shown in FIG. 13. This last setting can be useful when loading or unloading groceries or small boxed into or out of the cargo/passenger compartment 22.

When the electronic controller 70 moves the first door 34 and the second door 36 to their respective open orientations, the first door 34 and the second door 36 concealed above the headliner 48 of the vehicle body structure 14, as shown in FIG. 7. Further, with the first door 34 and the second door 36 in their respective open orientations, the first door 34 and the second door 36 are preferably horizontally oriented and parallel to one another.

With the first door 34 and the second door 36 moved ton their respective closed orientations, the first door 34 and the second door 36 are vertically oriented or approximately vertically oriented with the first door 35 being located above the second door 36.

The electronic controller 70 is further electronically connected to a plurality of clamping devices 74. The clamping devices 74 include levers that are movable between a clamping orientation and a release orientation. The clamping devices 74 are also referred to herein as cam mechanisms in that they can be configured with cam surfaces. The electronic controller 70 operates the clamping devices 74 to move to the clamping orientation when the first door 34 and the second door 36 are in their respective closed orientations. In their clamping orientations, the clamping devices 74 press against the door support devices 50 thereby urging the first door 34 and the second door 36 into firm contact with the seal $S_1$. In their release orientations, the clamping devices 74 pivot away from the door support devices 50 such that the first door 34 and the second door 36 can freely be moved from their closed orientations to other orientations.

When the electronic controller 70 is operated to move the doors 34 and 36 to their respective open orientations from their closed orientations, the electronic controller 70 releases the clamping devices 74 and operates the motors of the motorized door mechanism 52 to pull on the cables C thereby raising the doors 34 and 36. The second part 58 being made of a low friction producing material are free to slide along the tracks 42a, 44a, 42b and 44b. The cables C can be confined within the tracks 42a, 44a, 42b and 44b such that when the electronic controller 70 operates the motorized door mechanism 52 to lower the doors 34 and 36, the cables C can be pushed along the tracks 42a, 44a, 42b and 44b thereby lowering the doors 34 and 36.

When the electronic controller operates the motors 60a (orientation changing mechanisms) of the third parts of the door support devices 50, the motors 60a are configured to pivot a corresponding one of the first door 34 and the second door 36 to predetermined orientations. The motors 60a can be stepper motors or other devices that provide precise pivoting movement. Similarly, the motors of the motorized door mechanism 52 can be stepper motors providing precise movement of the cables C and consequently the doors 34 and 36.

It should be understood from the drawings and the description herein that the motors of the motorized door mechanism 52 can be located at the top of the tracks 42a, 42b, 44a and 44b, as shown in FIG. 7. Alternatively, additional motors of the motorized door mechanism 52 can be included such that motorized door mechanisms 52 can be located at the top of the tracks 42a, 42b. 44a and 44b, as shown in FIG. 7, and/or can be located at the bottom (not shown) of the tracks 42a, 42b, 44a and 44b.

Alternatively, the tracks 42a, 42b, 44a and 44b can be provided with gear teeth (not shown). The door support devices 50 can be provided with motors that provide door orientation (vertical and horizontal positioning) and motors with gears that engage the gear teeth of the tracks 42a, 42b, 44a and 44b. Consequently, all vertical and horizontal movement of the doors 34 and 36 along the tracks 42a, 42b, 44a and 44b, is provided by motors of the door support devices 50.

Second Embodiment

Figure 14:
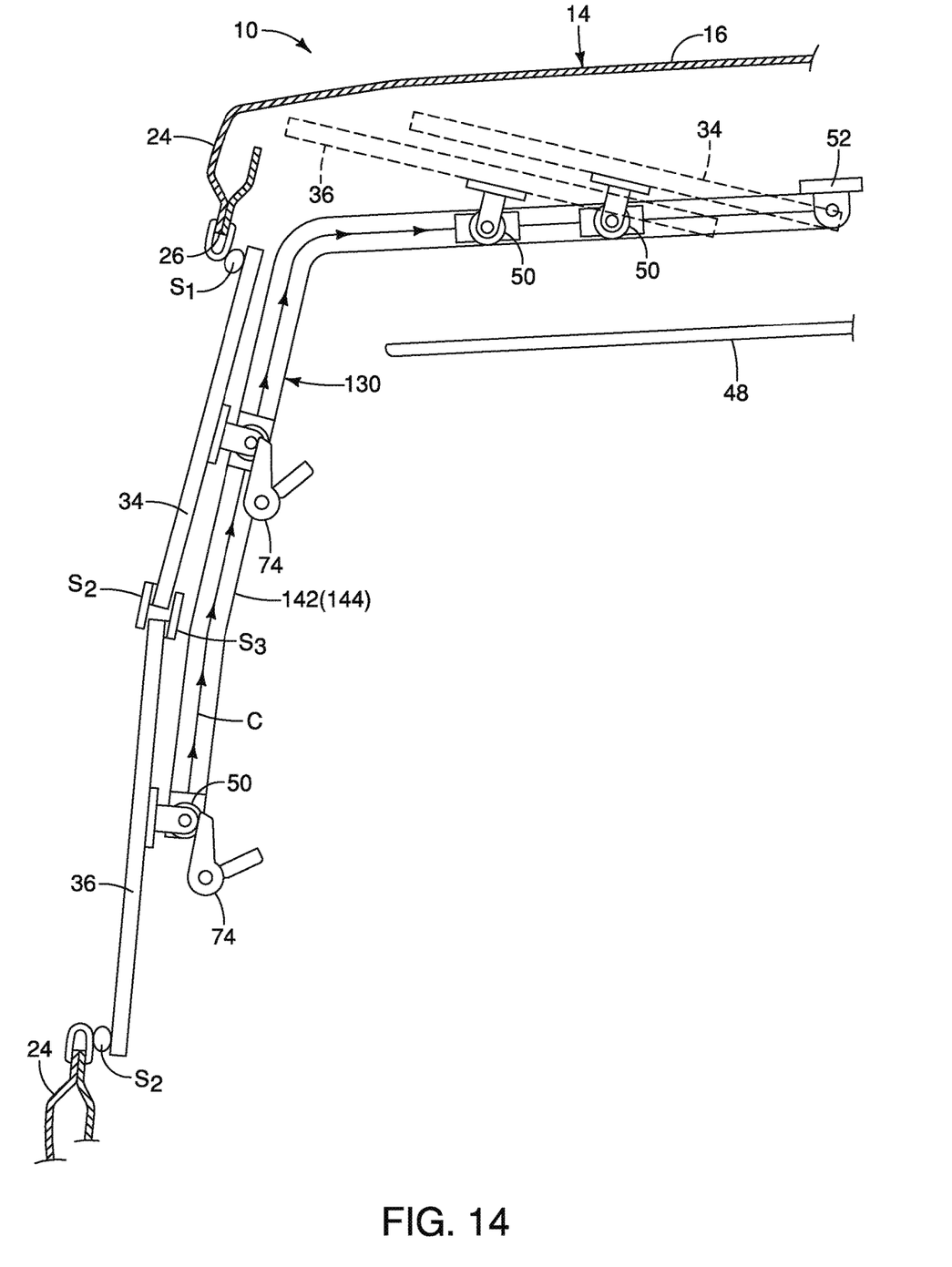
FIG. 14 is a schematic cross-sectional view of a rear portion of the vehicle showing the first door and the second door in solid lines in their respective closed orientations and in their respective open (stowed) orientations in phantom lines along with a single pair of tracks that the first door and second door are guided along during movement in accordance with a second embodiment.

Referring now to FIG. 14, a single pair of tracks 142 and 144 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the two pairs of tracks 42a, 42b, 44a and 44b are replaced with a single pair of tracks 142 and 144 (only track 142 is shown). In the second embodiment, the door support devices 50 of the first door 34 and the second door 36 all slide along the tracks 142 and 144, instead of having separate sets of tracks. When the doors 34 and 36 are in the stowed orientation, they are inclined with respect to horizontal, as shown in FIG. 14.

Third Embodiment

Figure 15:
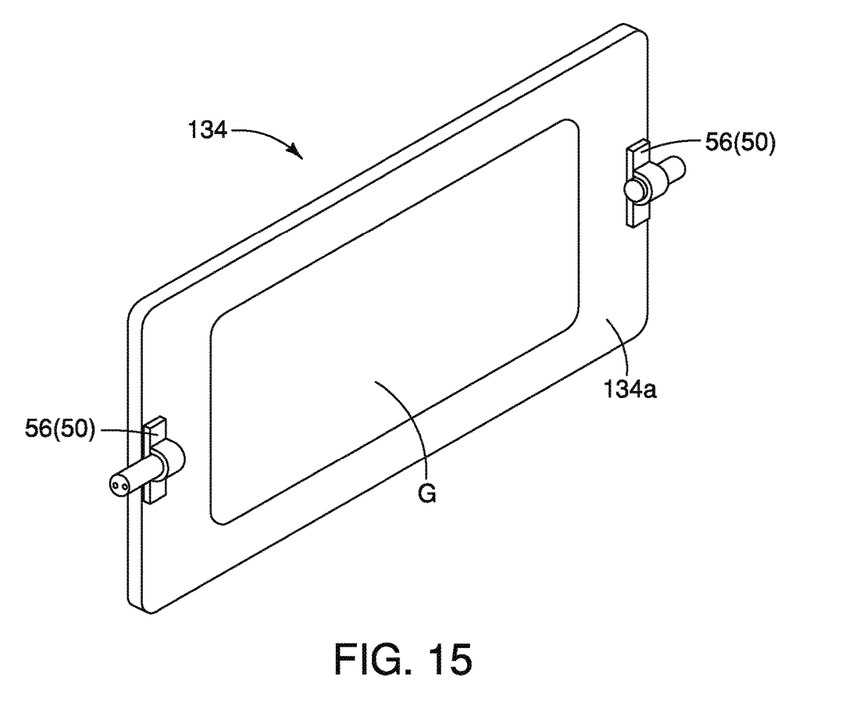
FIG. 15 is a perspective view of a first door of the door assembly, the first door having a metallic frame with a transparent material being supported in a central area of the metallic frame in accordance with a third embodiment.

Referring now to FIG. 15, a first door 134 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the first door 34 of the first embodiment is replaced with the first door 134. The first door 134 includes a metal frame 134a with the door support devices 50 attached thereto. The metal frame 134a supports a transparent material, such as glass G thereby defining a window.

Fourth Embodiment

Figure 16:
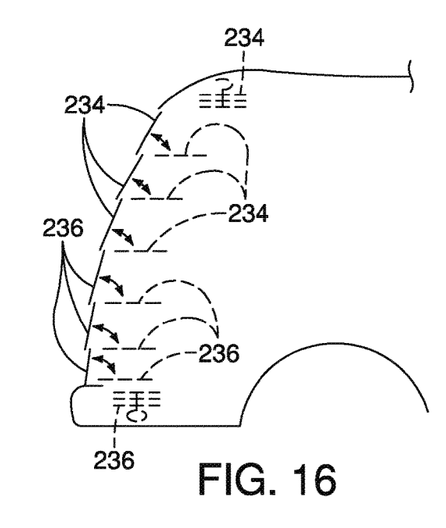
FIG. 16 is a side schematic view of a vehicle having a rear door opening with a plurality of first doors and a plurality of second doors that pivot between respective closed orientations to transitional orientations, the first doors being moved upward to stowed open orientations in accordance with a fourth embodiment.
Figure 17:
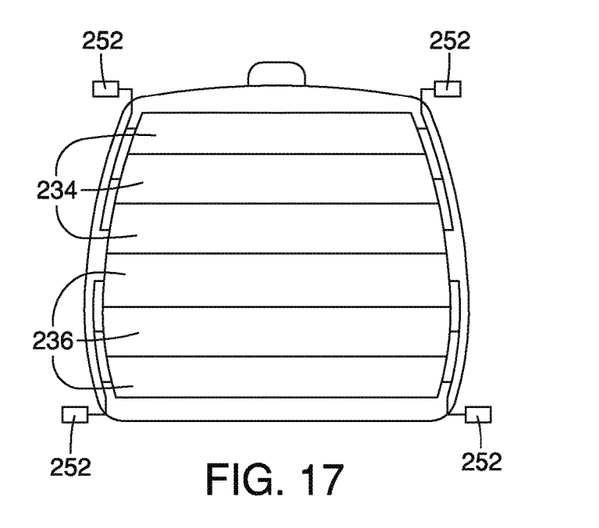
FIG. 17 is a rear schematic view of the first doors and the second doors in their respective closed orientations in accordance with the fourth embodiment.

Referring now to FIGS. 16 and 17, a plurality of first doors 234 and a plurality of second doors 246 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment there are a plurality of first doors 234 and a plurality of second doors 236 that pivot between closed orientations (solid lines) and transitional orientations (phantom lines). The plurality of first doors 234 can then be moved upward from the closed orientation to a stowed orientation above the rear opening and the plurality of second doors 236 can be moved down to a stowed orientation below the rear opening.

Movement of the plurality of first doors 234 and the plurality of second doors 236 is provided by a plurality of motorized door mechanisms 252 that are similar to the motorized door mechanisms 52 of the first embodiment. The motorized door mechanisms 252 are installed within the vehicle but are shown outside the vehicle in FIGS. 16 and 17 to show schematically the relationship between the motorized door mechanisms 252 and the first doors 234 and second doors 236.

The electronic controller 70 preferably includes a microcomputer with a door control program that controls the motorized door mechanism 52 and 252, the motors 60a of the door support devices 50 and the clamping devices 74, as discussed above. The electronic controller 70 can also include other conventional components such as an input interface circuit, an output interface circuit, and storage devices such as a ROM (Read Only Memory) device and a RAM (Random Access Memory) device. The electronic controller 70 is operatively coupled to the motorized door mechanism 52 and 252, the motors 60a of the door support devices 50 and the clamping devices 74 in a conventional manner. The electronic controller 70 can further be connected to various door position and door orientation sensors (not shown) that provide the electronic controller 70 with positioning and orientation data of each of the doors of the vehicle door assembly 12. The internal RAM of the electronic controller 70 stores statuses of operational flags and various control data such as door positioning and door orientation data correlated to the output of the sensors (not shown) and positioning and orientation data of each of the doors. The internal ROM of the electronic controller 70 stores data and motor interface data of the door assembly 12 for various operations. The electronic controller 70 is capable of selectively controlling any of the components of the door assembly 12 in accordance with the stored control program.

The various vehicle features and components other than those of the door assembly 12 are conventional components that are well known in the art. Since these vehicle features and components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied h such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
a vehicle body structure having a wall portion that defines a door opening;
a first door;
a second door; and
a support assembly fixed to the wall portion proximate the door opening and having at least one pair of tracks with door support devices and a motorized door mechanism, the door support devices independently supporting the first door and the second door for movement along the at least one pair of tracks and the motorized door mechanism being configured to raise and lower the door support devices along with the first door and the second door from respective closed orientations covering corresponding sections of the door opening and open orientations exposing the corresponding sections of the door opening, and with the first door and the second door in their respective open orientations, the first door and the second door are concealed above a headliner of the vehicle body structure.

2. The vehicle door assembly according to claim 1, wherein
the first door is made of a transparent material with first parts of the door support devices being fixed to opposite sides of the transparent material.

3. The vehicle door assembly according to claim 2, wherein
second parts of the door support devices are disposed within respective ones of the at least one pair of tracks for sliding movement with respect thereto, the second parts being pivotally coupled to the first parts.

4. The vehicle door assembly according to claim 2, wherein
the transparent material of the first door is a laminated glass.

5. The vehicle door assembly according to claim 2, wherein
the second door is made of a non-transparent material with further first parts of the door support devices being fixed to opposite sides of the second door.

6. The vehicle door assembly according to claim 1, wherein
the first door includes a metal frame that surrounds a transparent material.

7. The vehicle door assembly according to claim 1, wherein
the second door has an upper outer portion that includes a seal that contacts a lower inner portion of the first door such that with the first and second doors in their respective closed orientations, the seal is confined between the upper outer portion of the second door and the lower inner portion of the first door.

8. The vehicle door assembly according to claim 1, wherein
with the first door and the second door in their respective open orientations, the first door and the second door are horizontally oriented and parallel to one another.

9. The vehicle door assembly according to claim 8, wherein
with the first door and the second door in their respective closed orientations, the first door and the second door are vertically oriented with the first door being located above the second door.

10. The vehicle door assembly according to claim 1, further comprises
an electronic controller attached to the motorized door mechanism controlling movement of the first door and the second door between their respective closed orientations and open orientations.

11. A vehicle door assembly, comprising:
a vehicle body structure having a wall portion that defines a door opening;
a first door;
a second door; and
a support assembly fixed to the wall portion proximate the door opening and having at least one pair of tracks with door support devices and a motorized door mechanism, the door support devices independently supporting the first door and the second door for movement along the at least one pair of tracks and the motorized door mechanism being configured to raise and lower the door support devices along with the first door and the second door from respective closed orientations covering corresponding sections of the door opening and open orientations exposing the corresponding sections of the door opening, wherein
each of the door support devices includes a first part, a second part and a third part, respective ones of the first parts being fixed to opposite sides of the first door and opposite sides of the second door, the second parts being disposed within respective ones of the at least one pair of tracks for sliding movement with respect thereto, the second parts being pivotally coupled to the first parts, and the third parts being attached to the second parts for sliding movement therewith in the at least one pair of tracks, and at least a portion of the third parts including an orientation changing mechanism configured to pivot a corresponding one of the first door and the second door to predetermined orientations.

12. The vehicle door assembly according to claim 11, wherein
each of the third parts of the door support devices further being attached to a cable of the motorized door mechanism such that operation of the motorized door mechanism causes movement of the cable within the at least one pair of tracks thereby raising or lowering the third parts and corresponding one of the first door and the second door.

13. The vehicle door assembly according to claim 12, further comprises
an electronic controller attached to the orientation changing mechanisms of the third parts of the door support devices and the motorized door mechanism such that the electronic controller controls operation pivoting movement of the first door and the second door and controls operation of the motorized door mechanism during movement of the first door and the second door between their respective closed orientations and open orientations.

14. The vehicle door assembly according to claim 13, wherein
the wall portion that defines the door opening includes a seal along an inner surface adjacent to the door opening, the seal extending along top, bottom and lateral sides of the door opening.

15. The vehicle door assembly according to claim 14, wherein
the wall portion that defines the door opening also includes a least one cam mechanism with a lever moveable between a door sealing position and a door releasing position such in the door sealing position the lever presses against a corresponding one of the door support devices thereby pressing a corresponding one of the first door and the second door against the seal, the electronic controller being attached to the at least one cam mechanism controlling operation thereof.

16. The vehicle door assembly according to claim 11, further comprises
an electronic controller attached to the motorized door mechanism controlling movement of the first door and the second door between their respective closed orientations and open orientations.

17. A vehicle door assembly comprising:
a vehicle body structure having a wall portion that defines a door opening;
a first door;
a second door; and
a support assembly fixed to the wall portion proximate the door opening and having at least one pair of tracks with door support devices and a motorized door mechanism, the door support devices independently supporting the first door and the second door for movement along the at least one pair of tracks and the motorized door mechanism being configured to raise and lower the door support devices along with the first door and the second door from respective closed orientations covering corresponding sections of the door opening and open orientations exposing the corresponding sections of the door opening, and with the first door and the second door in their respective open orientations, the first door and the second door are horizontally oriented and parallel to one another.

18. The vehicle door assembly according to claim 17, wherein
with the first door and the second door in their respective closed orientations, the first door and the second door are vertically oriented with the first door being located above the second door.

19. The vehicle door assembly according to claim 17, further comprises
an electronic controller attached to the motorized door mechanism controlling movement of the first door and the second door between their respective closed orientations and open orientations.

* * * * *